United States Patent
Ota

(12) 
(10) Patent No.: US 6,561,597 B1
(45) Date of Patent: May 13, 2003

(54) ELECTROMAGNETICALLY DRIVING PART

(76) Inventor: Kazuhiro Ota, c/o Nissin Kogyo Co., Ltd., No. 840, Ohaza Kokubu, Ueda-shi, Nagano (JP)

( * ) Notice: Subject to any disclaimer, the term of this patent is extended or adjusted under 35 U.S.C. 154(b) by 0 days.

(21) Appl. No.: 09/657,057

(22) Filed: Sep. 7, 2000

(30) Foreign Application Priority Data

Sep. 8, 1999  (JP) ............................................. 11-253816
Mar. 27, 2000  (JP) ............................................. 12-086819

(51) Int. Cl.[7] .............................................. F16K 31/00
(52) U.S. Cl. ................................................. 303/119.2
(58) Field of Search ................... 303/119.2; 251/129.02, 251/129.14, 129.19; 137/596.17, 630

(56) References Cited

U.S. PATENT DOCUMENTS

| | | |
|---|---|---|
| 5,496,100 A | 3/1996 | Schmid |
| 5,649,748 A * | 7/1997 | Oehler et al. ............ 303/119.2 |
| 5,725,289 A * | 3/1998 | Mueller et al. .......... 303/119.2 |
| 5,788,344 A | 8/1998 | Friedow et al. |
| 5,810,330 A * | 9/1998 | Eith et al. ................ 303/119.2 |
| 5,887,624 A * | 3/1999 | Taniguchi et al. ....... 303/119.2 |
| 6,065,495 A * | 5/2000 | Fong et al. .............. 303/119.2 |

FOREIGN PATENT DOCUMENTS

| | | |
|---|---|---|
| JP | 9-506309 | 6/1997 |
| WO | WO 99/44872 | 9/1999 |
| WO | WO 99/50117 | 10/1999 |

* cited by examiner

*Primary Examiner*—Christopher P. Schwartz

(57) ABSTRACT

An electromagnetically driving part for use in opening/closing a valve or the like, comprises a guide cylinder 17 in which a movable core 18 is received slidably, and a fixed core 15 fixed to the guide cylinder 17. The fixed core 15 and the guide cylinder 17 are coupled with each other by welding in a state that the guide cylinder 17 is press-fitted onto the fixed core 15. An air gap 16a is formed between an outer circumferential surface of the fixed core 15 and an inner circumferential surface of the guide cylinder 17. The fixed core 15 and the guide cylinder 17 are welded with each other in a portion where the air gap 16a is formed. Accordingly, it is possible to weld a guide cylinder and a fixed core with each other surely, and to miniaturize an electromagnetically driving part.

16 Claims, 9 Drawing Sheets

ELECTROMAGNETICALLY DRIVING PART

BACKGROUND OF THE INVENTION

The present invention relates to an electromagnetically driving part for use in a vehicle braking system for performing antilock control, traction control, and so on.

First, the schematic configuration of a vehicle braking system using an electromagnetically driving part according to the present invention will be described with reference to FIG. 9. A left front wheel brake Bfl, a right rear wheel Brr, a right front wheel brake Bfr and a left rear wheel brake Brl are disposed in the respective wheels. In addition, a pair of master cylinders M/C form a tandem master cylinder so as to output braking fluid pressure corresponding to the depression of a brake pedal. A braking fluid pressure controller 100 is provided among the brakes Bfl, Brr, Bfr and Brl and the tandem master cylinder M/C so as to be connected with the brakes Bfl, Brr, Bfr and Brl through a main fluid-pressure channel II and with the master cylinder M/C through a main fluid pressure channel I.

A braking fluid pressure controller 100 has four normally open electromagnetic valves Vofl, Vorr, Vofr and Vorl; four check valves Cofl, Corr, Cofr and Corl; four normally closed electromagnetic valves Vcfl, Vcrr, Vcfr and Vcrl; a pair of reservoirs Ra and Rb; a pair of reciprocating plunger pumps Pa and Pb; and a plurality of fluid pressure channels for making these members communicate with one another. The normally open electromagnetic valves Vofl, Vorr, Vofr and Vorl are provided as valve means corresponding to the left front wheel brake Bfl, the right rear wheel Brr, the right front wheel brake Bfr and the left rear wheel brake Brl. The four check valves Cofl to Corl are connected in parallel with the normally open electromagnetic valves Vofl to Vorl respectively so as to be opened to send brake fluid from the corresponding wheel brakes Bfl to Brl back to the master cylinder M/C when the input to the master cylinder M/C is released. The normally closed electromagnetic valves Vcfl to Vcrl are provided individually correspondingly to the respective wheel brakes Bfl to Brl. The reservoirs Ra and Rb are provided respectively correspondingly to the left front wheel brake Bfl and the right rear wheel Brr and to the right front wheel brake Bfr and the left rear wheel brake Brl. The reciprocating plunger pumps Pa and Pb are connected with the reservoirs Ra and Rb respectively.

In addition, the braking fluid pressure controller 100 has a single braking fluid pressure controller motor (hereinafter referred to as a "motor" simply) M for driving both the plunger pumps Pa and Pb, and an electronic control unit ECU for controlling the switching of the respective normally open electromagnetic valves Vofl to Vorl and the respective normally closed electromagnetic valves Vcfl to Vcrl between demagnetization and excitation.

Running conditions of a vehicle are fed into the electronic control unit ECU from vehicle velocity sensors (not shown) provided in the respective wheels, and so on. In accordance with the running conditions of the vehicle, the electronic control unit ECU controls each of the wheel brakes Bfl to Brl on the basis of any one of the following three commands In a pressure increasing mode, one of the normally open electromagnetic valves Vofl to Vorl corresponding to the wheel in question is demagnetized and opened, and one of the normally closed electromagnetic valves Vcfl to Vcrl corresponding to the wheel in question is demagnetized and closed. Thus, the pressure is increased by the fluid pressure applied from the master cylinder M/C to a wheel cylinder (not shown). In a retaining mode, one of the normally open electromagnetic valves Vofl to Vorl corresponding to the wheel in question is excited and closed, and one of the normally closed electromagnetic valves Vcfl to Vcrl corresponding to the wheel in question is demagnetized and closed. Thus, the fluid pressure is prevented from being transmitted from the master cylinder M/C to a wheel cylinder (not shown), so that the fluid pressure is retained. In a pressure reducing mode, one of the normally open electromagnetic valves Vofl to Vorl corresponding to the wheel in question is excited and closed, and one of the normally closed electromagnetic valves Vcfl to Vcrl corresponding to the wheel in question is excited and opened. Thus, the braking fluid is reserved temporarily from a wheel cylinder (not shown) into the reservoirs Ra and Rb, so that the fluid pressure is reduced to prevent the wheel from being in a lock state.

Then, the electronic control unit ECU drives the motor M so as to drive the pumps Pa and Pb. Thus, the braking fluid reserved temporarily in the reservoirs Ra and Rb is sent back to the master cylinder M/C.

Next, a background-art configuration of such a normally open electromagnetic valve used in a vehicle braking system will be described with reference to FIG. 10. In FIG. 10, the reference numeral 10 represents a housing member or main body formed out of magnetic metal and shaped into a stepped cylinder. The housing member 10 is fitted into an electromagnetic valve fitting hole 12 formed in a substrate 11, and attached to an inner surface of the fitting hole 12 while being sealed fluid-tightly by using a seal member 13. The reference numeral 14 represents a snap ring for preventing the housing main body 10 from falling off. On one side of the housing main body 10, a cylindrical fixed core 15 of an electromagnetic coil 30 is provided to extend toward the outside of the fitting hole 12. The reference numeral 16 represents a communication path for making the aforementioned main fluid pressure channels I and II communicate with each other.

The reference numeral 17 represents a guide cylinder fixed to the fixed core 15. The guide cylinder 17 is formed out of non-magnetic material, for example, stainless steel, into a thin closed-end cylinder the front end of which is formed as a spherical closed end. The guide cylinder 17 is engaged with the external surface of the fixed core 15 by welding. The reference numeral 18 represents a movable core which is slidably received in the guide cylinder 17. A valve shaft 19 of non-magnetic material is inserted into the fixed core 15 slidably, and disposed so that a valve ball 20 provided as a valve body on the front end of the valve shaft 19 faces a valve hole 23 of a valve seat member 22. The valve shaft 19 is always in a position where the valve ball 20 is detached from the valve seat member 22 by the energizing operation of an elastic body 24, that is, in a position where the valve is opened. By the operation of magnetic flux generated when a current is made to flow through the electromagnetic coil 30, the movable core 18 is sucked and driven so that the valve ball 20 abuts against the valve seat member 22 and reaches the position where the valve is closed.

FIG. 11 shows in magnification the portion where the guide cylinder 17 is engaged with the fixed core 15. A press-in portion 15a is provided on the front end of the fixed core 15 so that the guide cylinder 17 is press-fitted onto the press-in portion 15a. After the guide cylinder 17 is press-fitted onto the press-in portion 15a, the guide cylinder 17 is welded with the press-in portion 15a from the external surface of the guide cylinder 17 and over the entire surface thereof so that the fixed core 15 and the guide cylinder 17 are seal-engaged with each other. A welded portion 40 shows a portion which was welded at the time of welding.

The process where the aforementioned welded portion 40 is formed will be described. The portion 40 is melted by heat at the time of welding, and metal vapor (gas) is generated then. There is a possibility that the metal vapor catches the molten metal and flies about when the metal vapor leaves the portion 40. Thus, there appears a phenomenon that the flying metal (sputtering) adheres to the external surface of the guide cylinder 17 or the portion 40 is formed to swell over the external surface of the guide cylinder 17 due to the surface tension of the molten metal when the molten metal is solidified. In the background art, taking such a phenomenon into consideration, a certain measure of clearance is provided between the internal surface of the electromagnetic coil 30 and the external surface of the guide cylinder 17. However, if this clearance is made large, the magnetic efficiency of a magnetic path in the electromagnetically driving part is lowered so that the electromagnetically driving part is prevented from being miniaturized in its radial direction.

In addition, a distance A (lift quantity) between the valve ball 20 and the valve seat member 22 in the electromagnetically driving part and a distance B (air gap) between the end surface of the fixed core 15 and the end surface of the movable core 18 are very important. It is necessary to assemble the electromagnetically driving part with high precision such that the allowable dimensional tolerances of the respective distances A and B are within 0.1 mm. In addition, the distances A and B are quantities related with each other. The sizes of the distances A and B are set in the relation "A<B". The reason why the distances A and B are set thus will be described. If the relation "A>B" is established, the movable core 18 is driven and sucked to the fixed core 15 when a current is made to flow through the electromagnetic coil 30. Although the valve shaft 19 ought to be pushed so that a contact seal is established between the valve ball 20 and the valve seat member 22, the fixed core 15 and the movable core 18 abut against each other earlier so that suction force is not transmitted to the valve shaft 19. Thus, such a contact seal cannot be established, and the OFF responsibility deteriorates when the electromagnetically driving part is demagnetized.

The suction force acting on the fixed core 15 changes in a quadratic curve due to the aforementioned distance B (air gap). Therefore, the size of the distance B affects the ON-OFF responsibility on a large scale to thereby cause a failure in performance. Shrinkage in welding also causes a variation in the distances A and B to affect the tolerances of the distances A and B. The shrinkage in welding means that the guide cylinder 17 shrinks to compensate a volume caused by the above-mentioned vaporization and flying-about of metal at the time of welding. It is therefore necessary to take the quantity of shrinkage after welding into consideration beforehand when the respective guide cylinder 17 and valve seat member 22 are pressed onto and into the fixed core 15 so as to be assembled therewith. Incidentally, this quantity of shrinkage also varies to some extent.

On the other hand, there are various factors of reduction in the press-in accuracy of the electromagnetically driving part as follows. Deformation is caused when the guide cylinder 17 is press-fitted; the guide cylinder 17 may be press-fitted slantingly with respect to its axis; when the guide cylinder 17 is press-fitted, it comes back from its press-fitted position due to spring-back; a scattering may be caused in a press-fitting load due to a scattering in the appearance of the external surface of the fixed core 15 or a sliding resistance thereof; a scattering may be caused in measuring the dimensions of parts even if the press-fitted position of the guide cylinder 17 is adjusted in accordance with the dimensions of the parts measured beforehand when the guide cylinder 17 is press-fitted; and so on.

Of these factors, in order to increase the press-in accuracy of the guide cylinder 17, it is effective to reduce the press-fitting load when the guide cylinder 17 is press-fitted. Therefore, the front end portion of the press-in portion 15a is reduced in diameter so that a guide portion 15b for guiding the guide cylinder 17 is provided to take measures to prevent the press-fitting load from increasing. In addition, it is preferable to make the guide portion 15b longer, in such a manner that the guide portion 15b makes it easier to guide the guide cylinder 17 and prevents the guide cylinder 17 from inclining.

As another measurement for reducing the press-fitting load, such a method may be considered that the length of the press-in portion 15a is made as short as possible. However, when the guide cylinder 17 is welded with the outer circumference of the press-in portion 15a in consideration of scattering in dimensions of welding equipment, support jigs, and constituent parts relating to the welding position, the press-in portion 15a has to have a certain length.

As has been described, in the background-art electromagnetically driving part, the guide portion 15b and the press-in portion 15a have to have a certain length which is long enough to press the guide cylinder 17 into the fixed core 15 with precision and weld the guide cylinder 17 with the press-in portion 15a. Thus, the fixed core 15 is prevented from being miniaturized. In addition, in terms of the diameter direction of the electromagnetically driving part, it is necessary to allow a clearance between the external surface of the guide cylinder 17 and the internal surface of the electromagnetic coil 30. Thus, the electromagnetically driving part is prevented from being miniaturized.

SUMMARY OF THE INVENTION

The present invention was achieved to solve these problems. It is an object of the present invention to provide an electromagnetically driving part in which the dimensions in the axial direction and in the radial direction are shortened so that the electromagnetically driving part can be miniaturized while improving the accuracy in assembling, and in which a guide cylinder and a fixed core are surely engaged with each other by welding so that the reliability is high.

To attain the foregoing object, according to an aspect of the present invention, there is provided an electromagnetically driving part for use in opening/closing a valve or the like, comprising a guide cylinder in which a movable core is received slidably, and a fixed core fixed to the guide cylinder, the fixed core and the guide cylinder being engaged with each other by welding in a state that the guide cylinder is press-fitted onto the fixed core; wherein an air gap is formed between an outer circumferential surface of the fixed core and an inner circumferential surface of the guide cylinder; and wherein the fixed core and the guide cylinder are welded with each other in a portion where the air gap is formed. Because the fixed core and an internal surface of the guide cylinder are welded with each other in the portion where an air gap is formed, the welded portion is not formed to swell over the external surface of the guide cylinder. Accordingly, the clearance between the guide cylinder and the internal surface of an electromagnetic coil inserted onto the guide cylinder can be set to be small. In addition, sputtering is prevented at the time of welding, so that the bonding can be performed with high reliability.

Preferably, in the above electromagnetically driving part, a front end of a press-in portion of the fixed core onto which the guide cylinder is press-fitted is reduced in diameter so that an air gap is formed between the outer circumferential surface of the fixed core and the inner circumferential surface of the guide cylinder; and the fixed core and the guide cylinder are welded with each other in a portion where the air gap is formed. Accordingly, the axial length of the fixed core is reduced so that the electromagnetically driving part can be miniaturized.

Preferably, in the above electromagnetically driving part, the inner circumferential surface of the guide cylinder at its front end is enlarged in diameter so that an air gap is formed between the outer circumferential surface of the fixed core and the inner circumferential surface of the guide cylinder; and the fixed core and the guide cylinder are welded with each other in a portion where the air gap is formed. Accordingly, the shrinkage of the guide cylinder generated at the time of welding can be absorbed on the open end side of the guide cylinder. Therefore, the accuracy in attachment of the guide cylinder and a valve seat member can be improved.

Preferably, in the above electromagnetically driving part, the guide cylinder and the fixed core are welded with each other by laser welding. Accordingly, the guide cylinder and the fixed core are engaged with each other easily and surely.

DETAILED DESCRIPTION OF THE PREFERRED EMBODIMENTS

Preferred embodiments of the present invention will be described below in detail with reference to the accompanying drawings.

Figure 1:
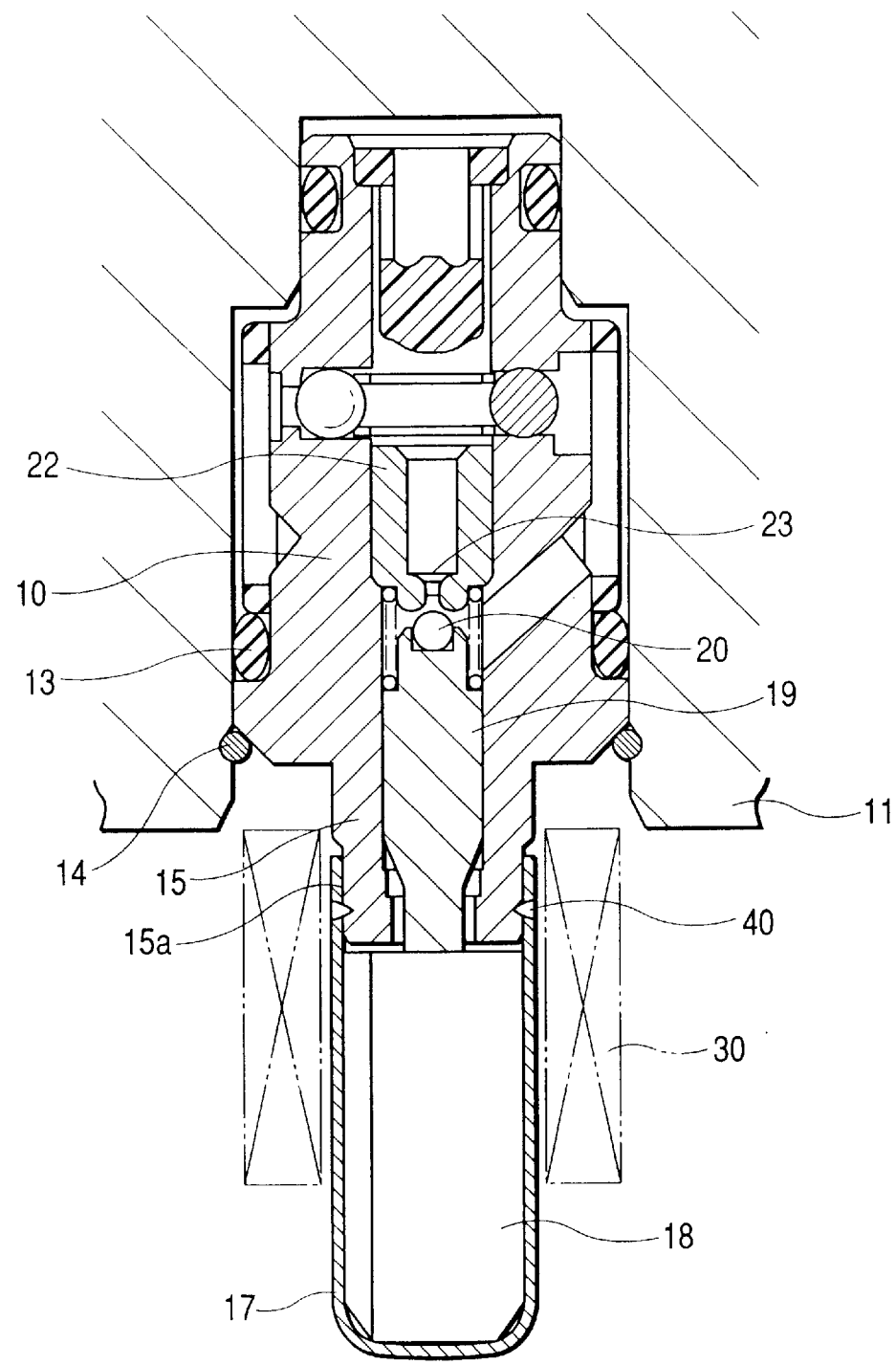
FIG. 1 is a sectional view showing the configuration of a first embodiment of an electromagnetically driving part according to the present invention.
Figure 10:
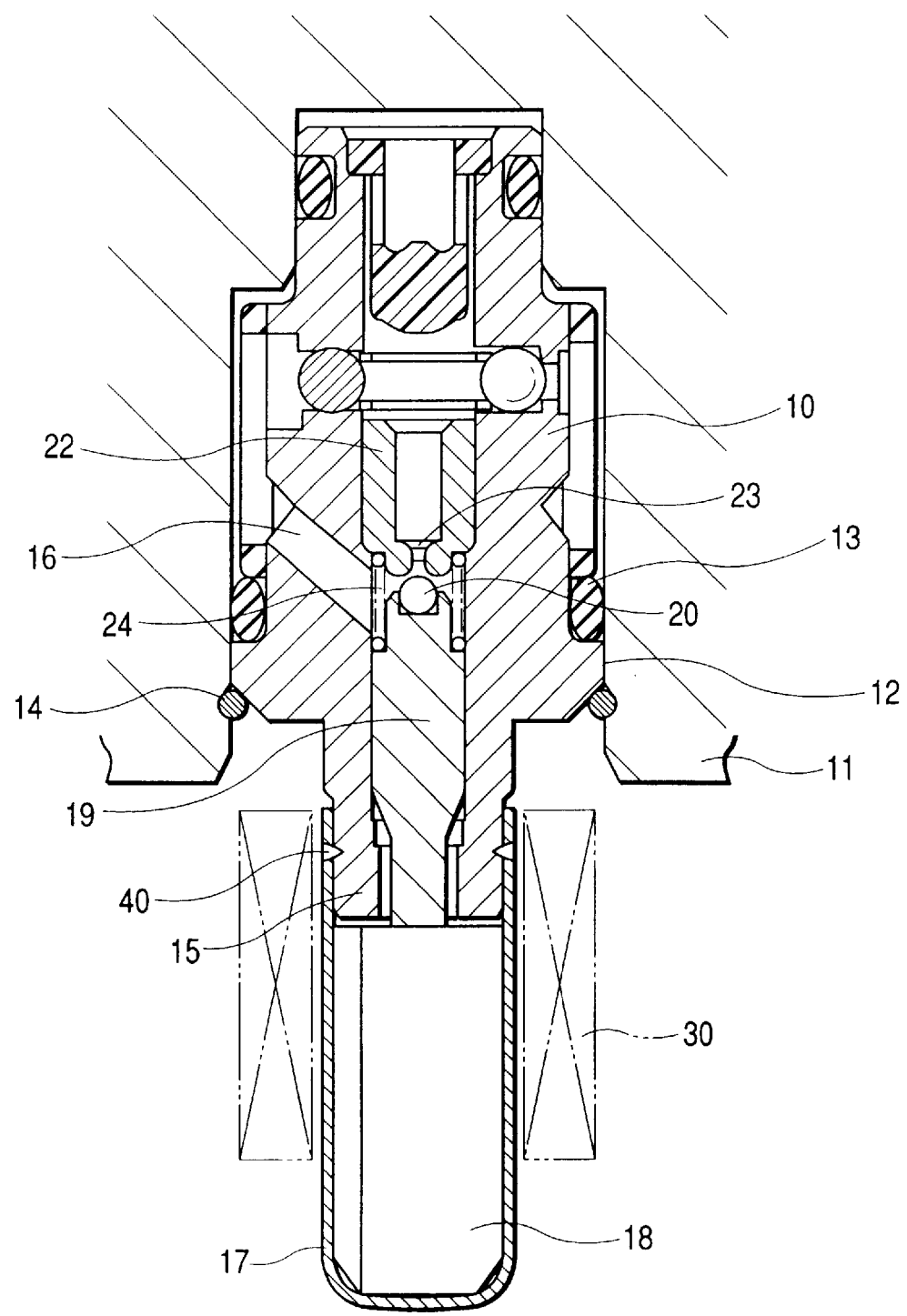
FIG. 10 is a sectional view showing the configuration of a background-art electromagnetically driving part.

FIG. 1 is a sectional view showing the whole configuration of a first embodiment of an electromagnetically driving part according to the present invention. Each portion of the electromagnetically driving part shown in FIG. 1 is basically configured similarly to that in the background-art electromagnetically driving part shown in FIG. 10. The electromagnetically driving part in this embodiment has a distinctive configuration in the arrangements of a fixed core 15 and a guide cylinder 17 which is engaged with the fixed core 15 by laser welding. Therefore, description will be made chiefly about the engaged portion between the fixed core 15 and the guide cylinder 17.

Figure 2:
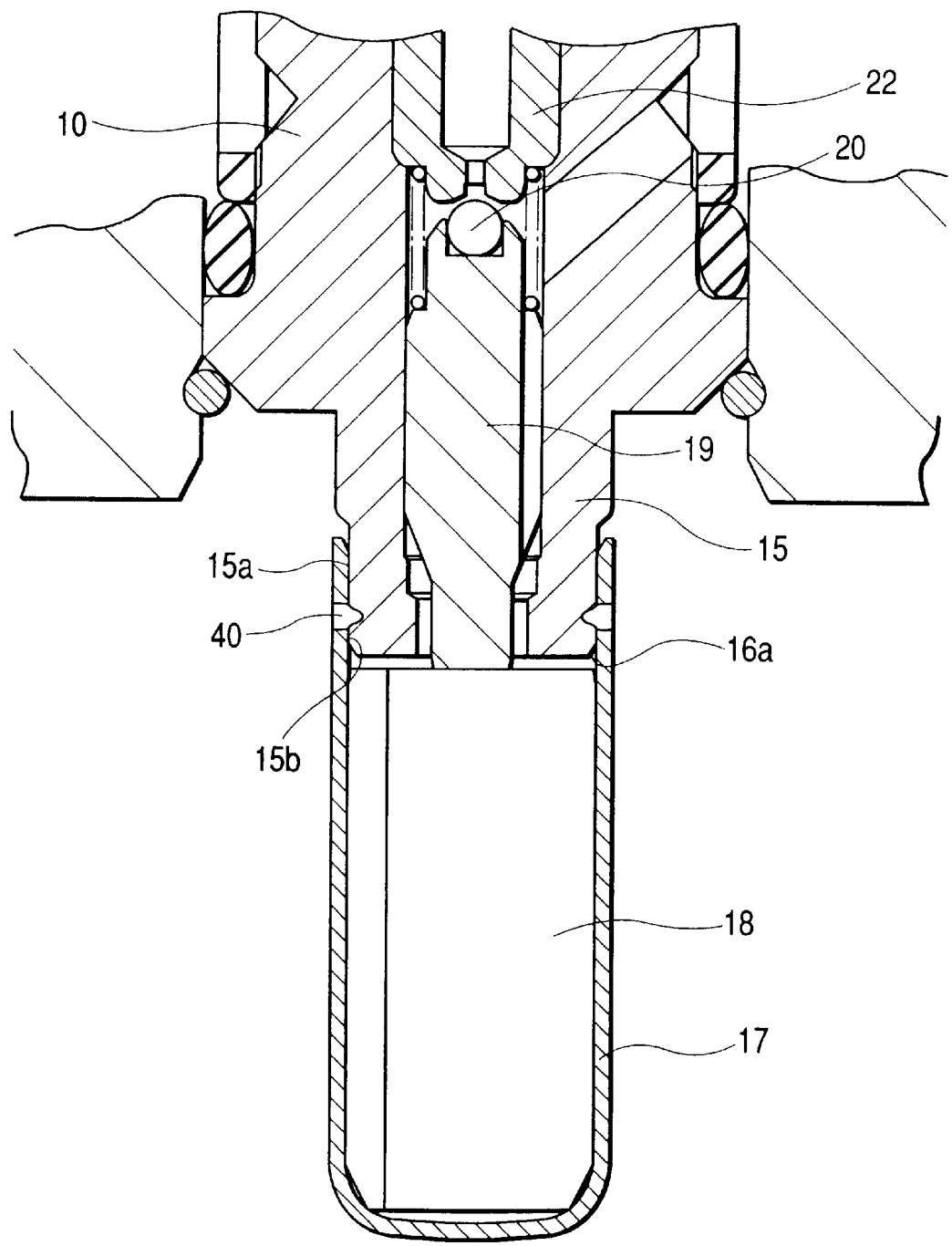
FIG. 2 is a sectional view showing in magnification the portion where a fixed core and a guide cylinder are engaged with each other in the first embodiment.

FIG. 2 shows in magnification the engaged portion between the fixed core 15 and the guide cylinder 17.

Also in this embodiment, the guide cylinder 17 is press-fitted onto a press-in portion 15a of the fixed core 15, and engaged with the outer circumferential surface of the fixed core 15 by laser welding. The press-in portion 15a provided on the front end of the fixed core 15 is formed to be reduced in diameter by a quantity which is substantially equal to the thickness of the guide cylinder 17, in the same manner as in the background-art example. Thus, the press-in portion 15a is set so that the outer diameter of the guide cylinder 17 becomes equal to the outer diameter of the fixed core 15 at its base end portion in the state where the guide cylinder 17 is engaged with the front end of the fixed core 15. In order to make it easy to press-fit the guide cylinder 17 onto the fixed core 15, a guide portion 15b the diameter of which is reduced to be a little smaller than the press-in portion 15a is formed on the front end portion of the fixed core 15 in the same manner as in the background-art example. In this embodiment, there are features in that the axial length of the press-in portion 15a is set to be shorter than that in the background-art, and that a welded portion 40 is established within a region where the guide portion 15b is formed when the guide cylinder 17 is laser-welded with the fixed core 15.

Figure 11:
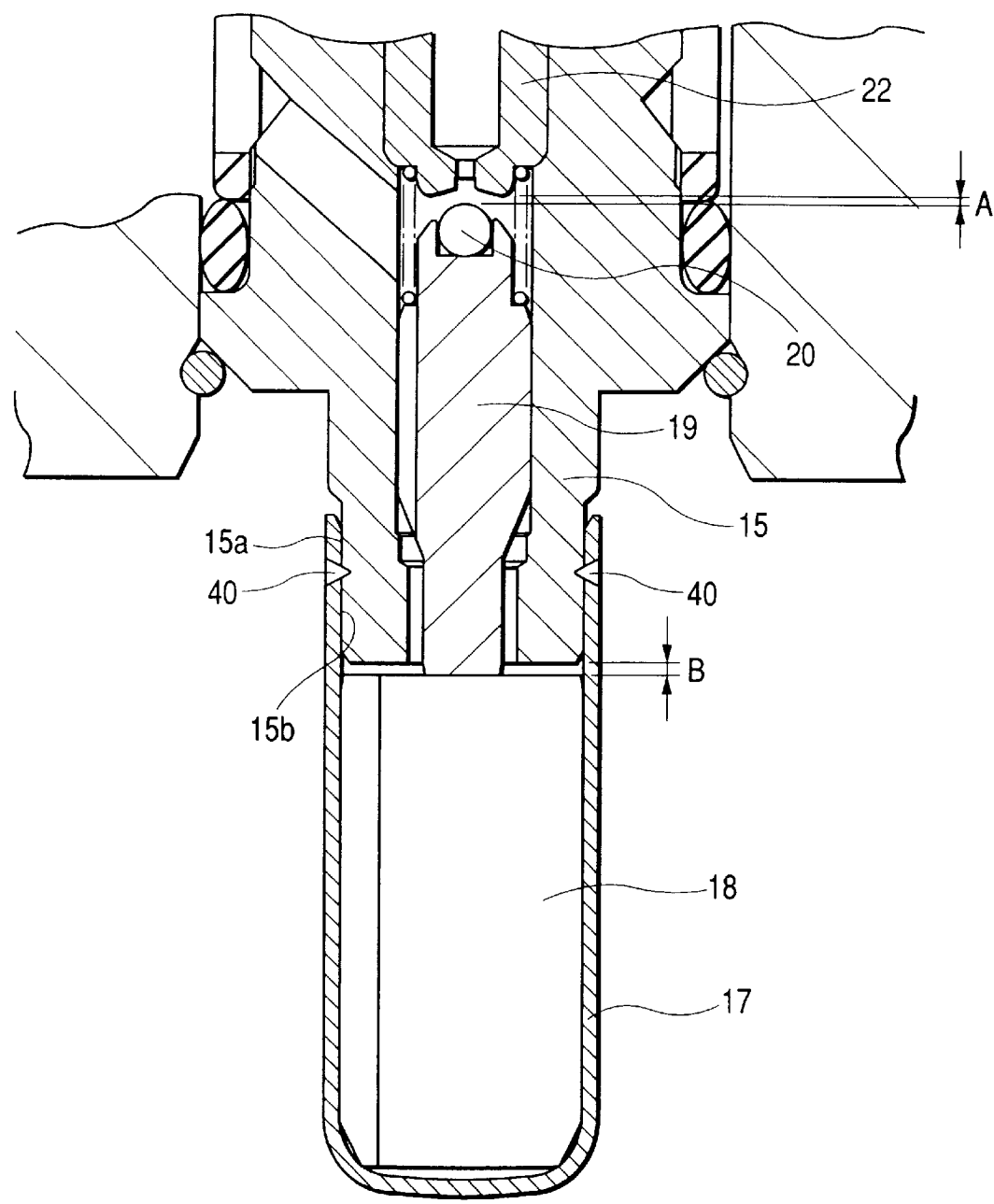
FIG. 11 is a sectional view showing in magnification the configuration of the background-art electromagnetically driving part.

This difference in the position where the fixed core 15 and the guide cylinder 17 are engaged with each other is obvious in comparison between FIG. 11 showing the background-art configuration and FIG. 2 showing the configuration of this embodiment. That is, laser welding is out of the position where the guide portion 15b of the fixed core 15 is formed in the background art, while laser welding is on the position where the guide portion 15b is formed in this embodiment. The portion where the guide portion 15b is formed is the portion which is formed to have a diameter smaller than that of the press-in portion 15a in order to make it easy to insert the guide cylinder 17. Therefore, a slight air gap 16a is formed between the internal surface of the guide cylinder 17 and the guide portion 15b.

The electromagnetically driving part according to the present invention is configured so that bonding with stable quality can be attained by laser welding within the region of the guide portion 15b of the fixed core 15 where the air gap 16a is formed.

Figure 3:
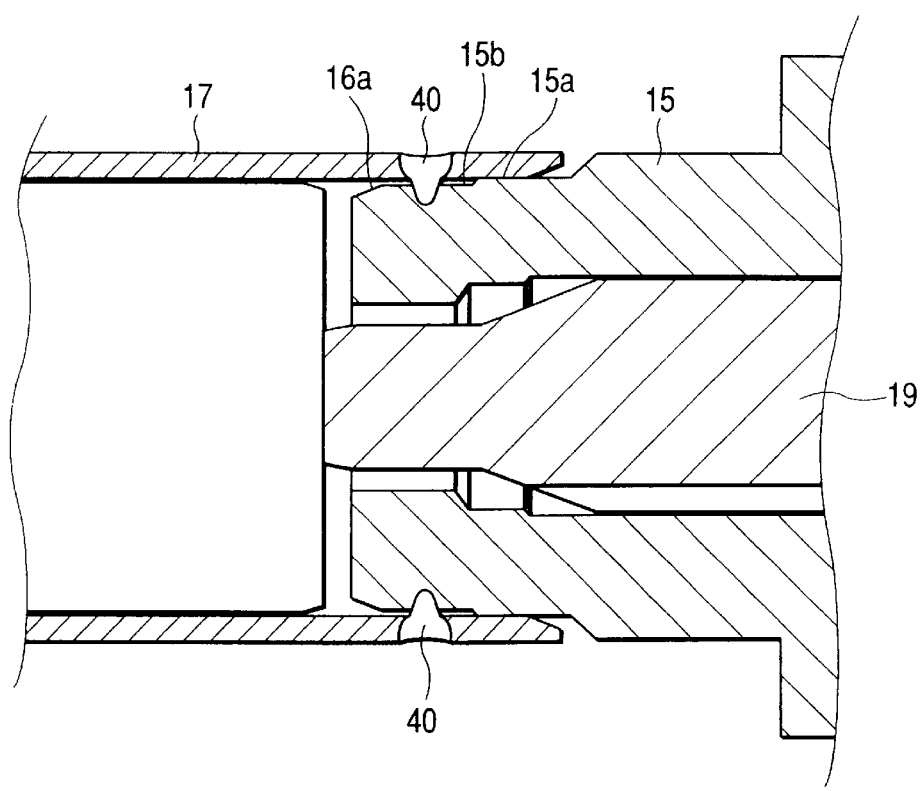
FIG. 3 is a sectional view showing in magnification the portion where the fixed core and the guide cylinder are engaged with each other in the first embodiment.

FIG. 3 shows, further in magnification, the portion where the fixed core 15 and the guide cylinder 17 are engaged with each other by laser welding. The guide portion 15b of the fixed core 15 has a diameter which is made smaller than the press-in portion 15a, so that the air gap 16a is formed between the guide portion 15b and the internal surface of the guide cylinder 17. The portion where the guide cylinder 17 is welded with the fixed core 15 by laser welding is within the region where the guide portion 15b of the fixed core 15 is formed.

When such portions between which the air gap 16a is formed, for example, between the guide cylinder 17 and the guide portion 15b, are engaged with each other by laser welding, there are advantages as follows. It can be noted first that the external surface of the welded portion is not formed to swell, so that the external surface position of the welded portion 40 and the external surface position of the guide cylinder 17 can be formed substantially on one and the same plane. When bonding is performed by a welding method such as laser welding or the like, a product to be worked is melted in the engaged portion, and cooled to be solidified. If there is an air gap in the engaged portion of the product to be worked, a part of the molten substance can escape into the air gap so that a sink is generated in the molten substance. Thus, the external surface of the welded portion can be prevented from swelling.

In a practical example where iron material was used for the fixed core 15 and non-magnetic material was used for the guide cylinder 17, the welded portion 40 could be engaged with little swelling. The air gap 16a between the guide cylinder 17 and the guide portion 15b can be adjusted suitably so that a desired welded portion 40 can be formed while the welded portion 40 is prevented from being formed into a swollen shape or an excessively sunk shape. Because the external surface of the welded portion 40 is prevented from being formed into a swollen shape, the clearance between the electromagnetic coil 30 and the guide cylinder 17 can be reduced sufficiently. Thus, the magnetic efficiency can be improved.

In addition, in the case where the air gap 16a is provided between the guide cylinder 17 and the guide portion 15b, metal vapor generated from the product to be worked at the time of welding can be escaped through the air gap 16a. There is another advantage that sputtering is prevented.

In addition, as shown in FIGS. 2 and 3, the fact that the welded portion 40 is established in the guide portion 15b provided in the fixed core 15 means the possibility that a portion which was not used for welding in the background-art fixed core 15 is available, and hence the possibility that the length of the press-in portion 15a of the fixed core 15 can be shortened as much. That is, by welding in the above-mentioned method, the length of the fixed core 15 can be reduced so that the axial length of the electromagnetically driving part can be reduced and the product can be miniaturized.

In addition, because the welded portion 40 is established within the region of the guide portion 15b in this embodiment, the guide portion 15b can be ensured to be longer than that in the background-art product. If the guide portion 15b is ensured to be longer, the operation of pressing the guide cylinder 17 into the fixed core 15 becomes easier, and the guide cylinder 17 is prevented from being pressed in as it is inclined. As a result, factors in increasing the press-fitting load can be restrained, so that parts can be set with precision.

According to the present invention, together with the precision when the parts are set and the welding method by which the influence of metal vapor or the like generated at the time of welding is restrained so that the guide cylinder 17 and the fixed core 15 can be welded with each other surely, an extraordinary precision in assembling as the electromagnetically driving part can be obtained.

Figure 4:
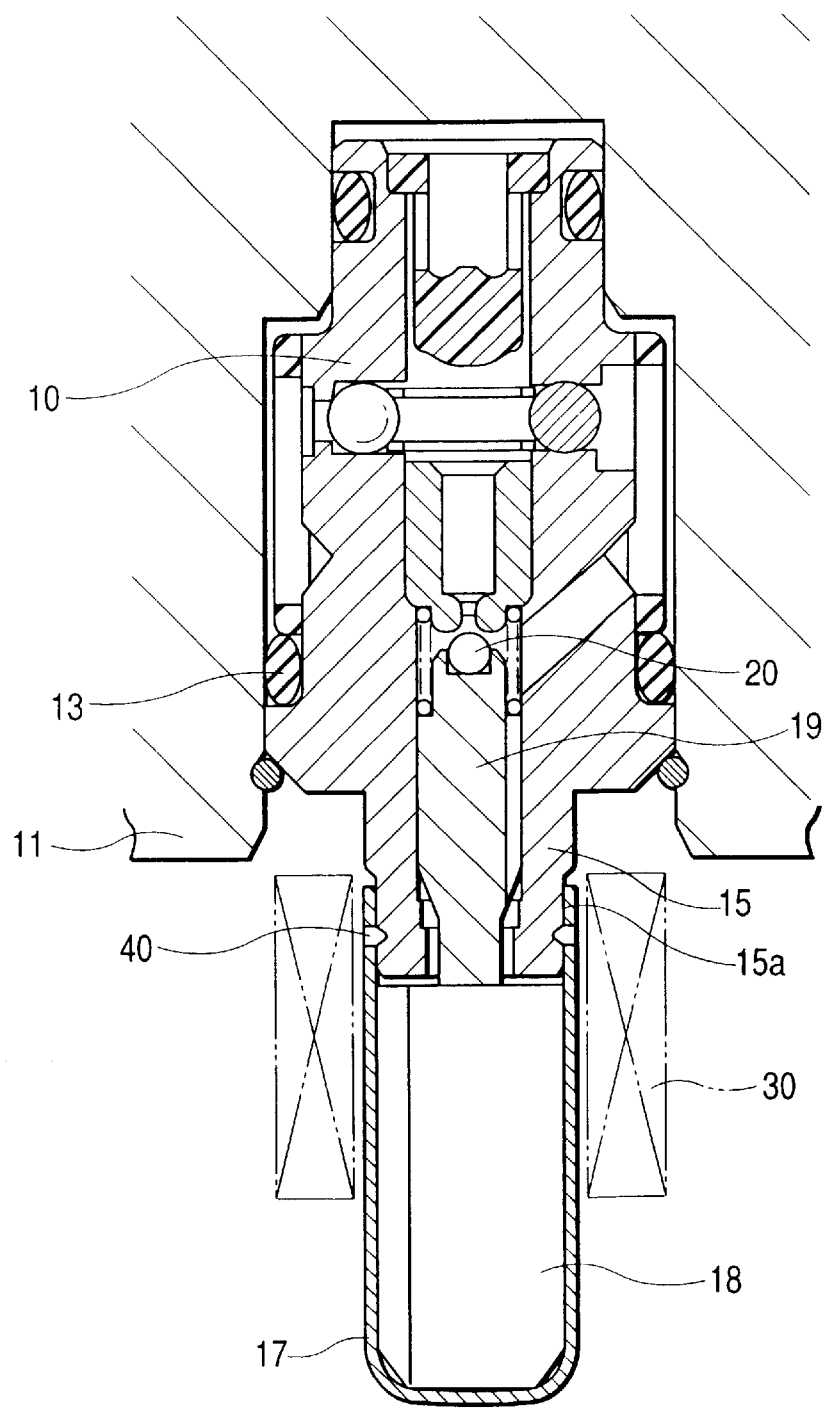
FIG. 4 is a sectional view showing the configuration of a second embodiment of an electromagnetically driving part according to the present invention.
Figure 5:
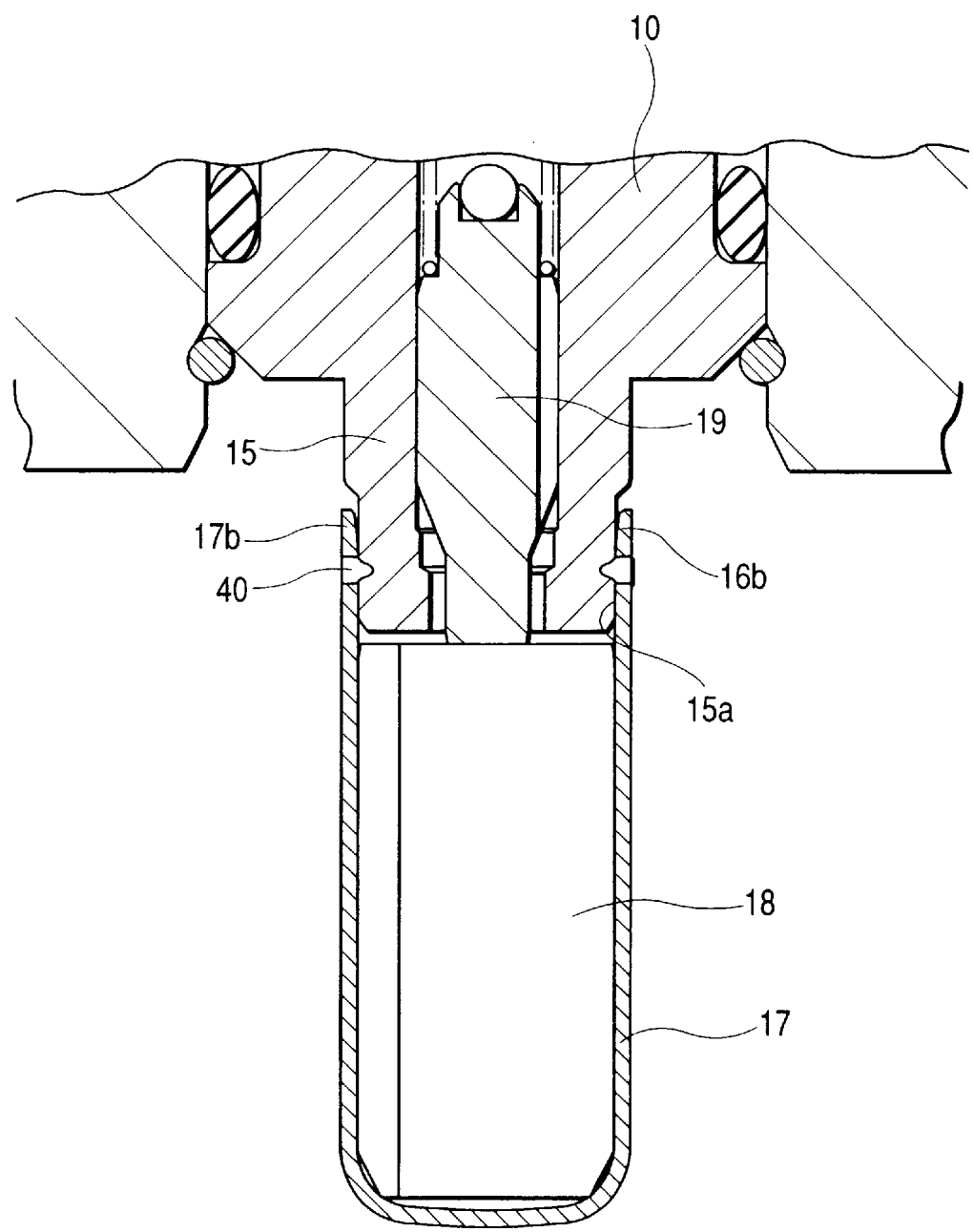
FIG. 5 is a sectional view showing in magnification the portion where a fixed core and a guide cylinder are engaged with each other in the second embodiment.

FIGS. 4 and 5 show the configuration of a second embodiment of an electromagnetically driving part according to the present invention. The electromagnetically driving part in this embodiment is basically configured similarly to that in the electromagnetically driving part in the above-mentioned embodiment. However, the electromagnetically driving part in this embodiment has a feature in that a guide portion 17b is formed in a guide cylinder 17 so as to fit the guide cylinder 17 onto the fixed core 15 in this embodiment while the guide portion 15b is formed in the fixed core 15 so as to fit the guide cylinder 17 onto the fixed core 15 in the above-mentioned embodiment.

In this embodiment, because no guide portion is formed in the fixed core 15, a press-in portion 15a is formed to have one and the same diameter from its base end to its front end. On the other hand, the internal surface of the guide cylinder 17 at its front end is enlarged slightly while the external diameter of the guide cylinder 17 has one and the same size. Thus, the guide portion 17b is formed. That is, by enlarging the diameter of the internal surface of the guide cylinder 17 at its fitting side, the guide cylinder 17 is configured to be fitted easily onto the fixed core 15.

In the above-mentioned embodiment, the welded portion 40 was provided in a position within the region of the guide portion 15b formed on the front end of the fixed core 15. On the other hand, this embodiment has a feature in that the welded portion 40 is provided within a region where the air gap 16b is formed between the front end of the guide cylinder 17 and the external surface of the fixed core 15 in the state where the guide cylinder 17 is press-fitted to the fixed core 15, such operation and effect that bonding can be performed while the welded portion 40 is prevented from swelling because welding is performed in the portion where the air gap 16b is formed, are obtained similarly to those in the above-mentioned embodiment.

Figure 6:
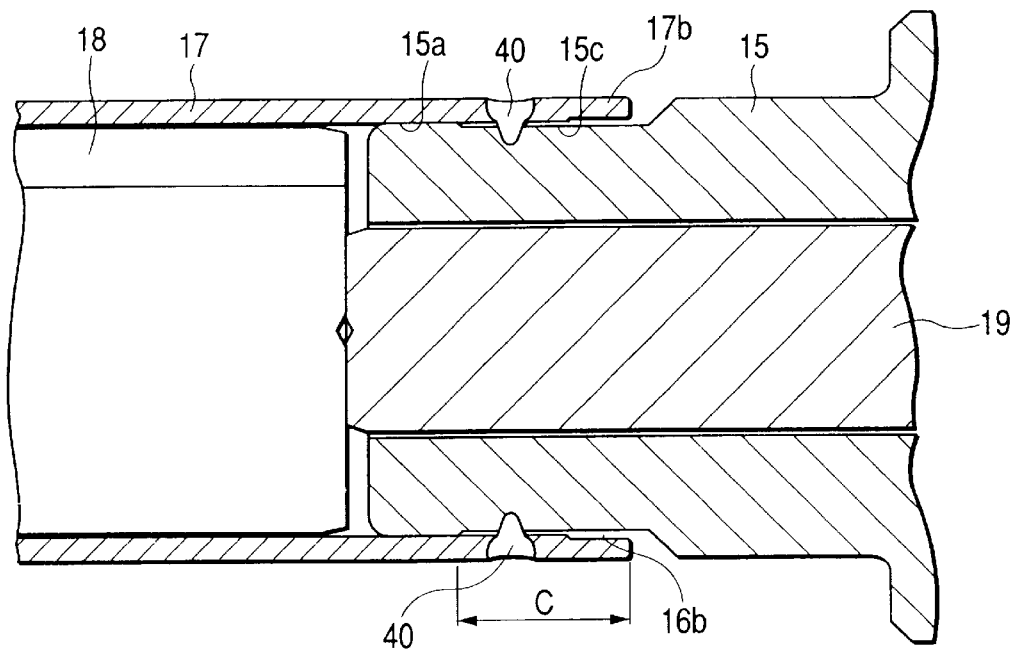
FIG. 6 is a sectional view showing in magnification the configuration of the portion where the fixed core and the guide cylinder are engaged with each other in the second embodiment.

FIG. 6 shows, further in magnification, the portion where the guide cylinder 17 and the fixed core 15 are engaged with each other. In the illustrated embodiment, the guide portion 17b is provided on the front end of the guide cylinder 17 while a slight diameter-reduced portion 15c is formed in a portion of the press-in portion 15a of the fixed core 15 corresponding to the front end of the guide cylinder 17 in the state where the guide cylinder 17 is press-fitted. The diameter-reduced portion 15c is provided for adjusting the air gap between the internal surface of the guide cylinder 17 and the external surface of the fixed core 15. In this case, the guide portion 17b provided in the guide cylinder 17 is formed apart at a large distance from the press-in portion 15a merely for a guide operation for inserting the guide cylinder 17. Not to say, in place of the diameter-reduced portion 15c provided in the fixed core 15, a guide portion for fitting and a guide portion for air gap adjustment may be formed in the guide cylinder 17 so that the inner diameters of the guide portions differ from each other.

Thus, the guide portion 17b is provided for forming an air gap in the state where the guide cylinder 17 is press-fitted onto the fixed core 15. The portion for forming the air gap may be formed in the fixed core 15 side or in the guide cylinder 17 side, or in the both in terms of their relative relationship.

Further, the quantity of the air gap formed between the fixed core 15 and the guide cylinder 17 can be set suitably in accordance with the material and the welding method used for them. Normally the radius of the air gap can be set in a range of from about 0.03 mm to about 0.1 mm.

Figure 7:
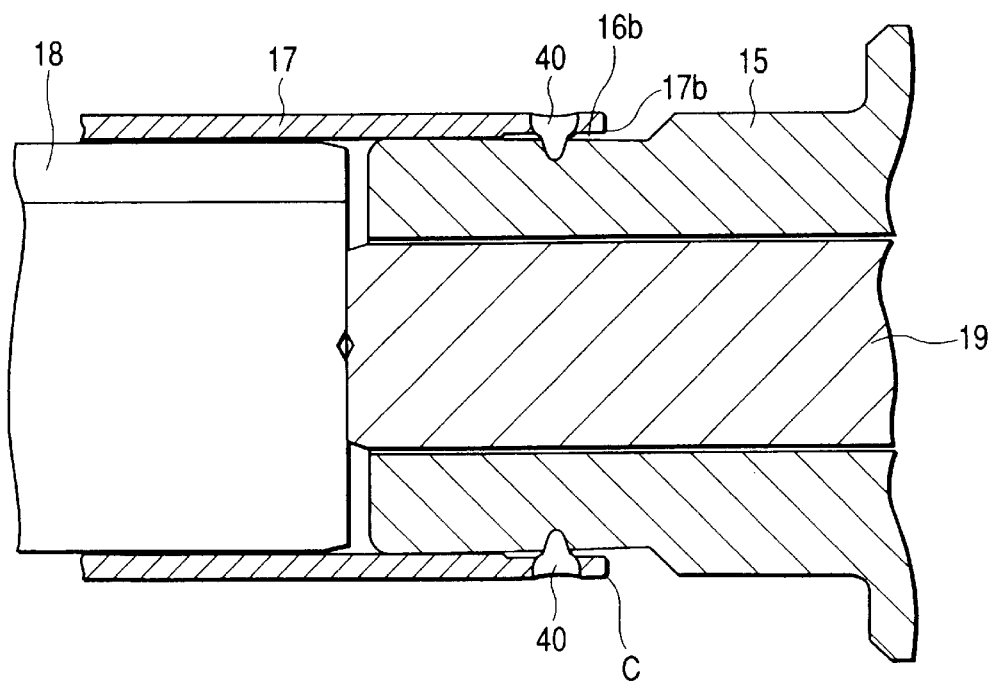
FIG. 7 is a sectional view showing in magnification the configuration of the portion where a fixed core and a guide cylinder are engaged with each other in a third embodiment of an electromagnetically driving part according to the present invention.

FIG. 7 shows in magnification the configuration of the portion where a fixed core 15 and a guide cylinder 17 are engaged with each other in a third embodiment of an electromagnetically driving part according to the present invention. In FIG. 7, an air gap 16b is formed between the outer circumferential surface of the fixed core 15 and the inner circumferential surface of the guide cylinder 17 in the state where the guide cylinder 17 is press-fitted onto the fixed core 15. The inner circumferential diameter of the guide cylinder at its front end, which is a free end, is enlarged slightly so as to form a guide portion 17b. Thus, the air gap 16b is provided between the outer circumferential surface of the fixed core 15 and the guide portion 17b of the guide cylinder 17. A welded portion 40 is provided between the fixed core 15 and the guide portion 17b in the guide cylinder 17.

Figure 8:
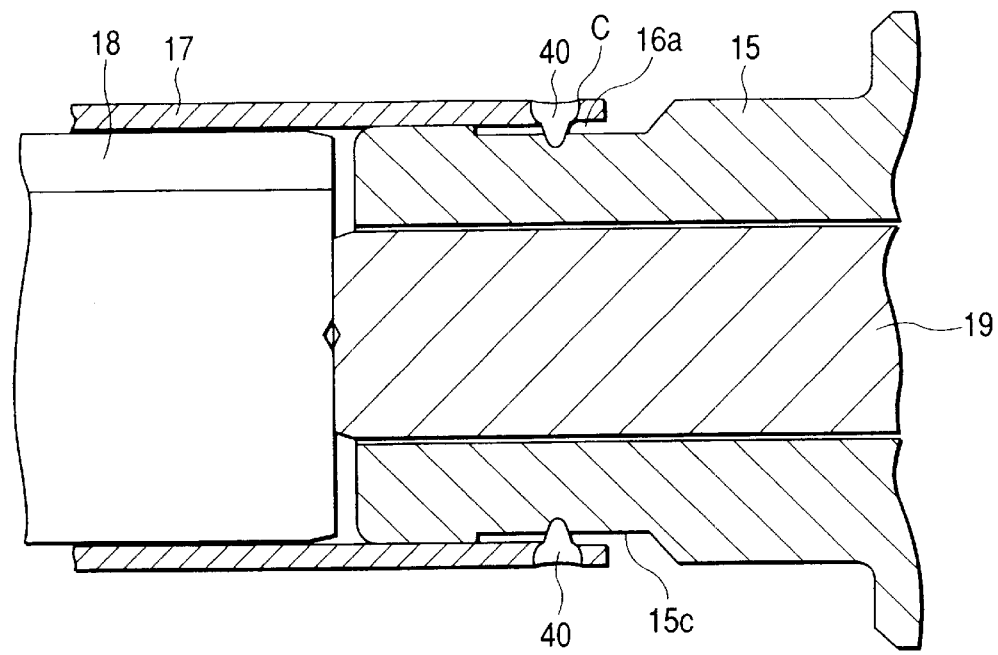
FIG. 8 is a sectional view showing in magnification the configuration of the portion where a fixed core and a guide cylinder are engaged with each other in a fourth embodiment of an electromagnetically driving part according to the present invention.
Figure 9:
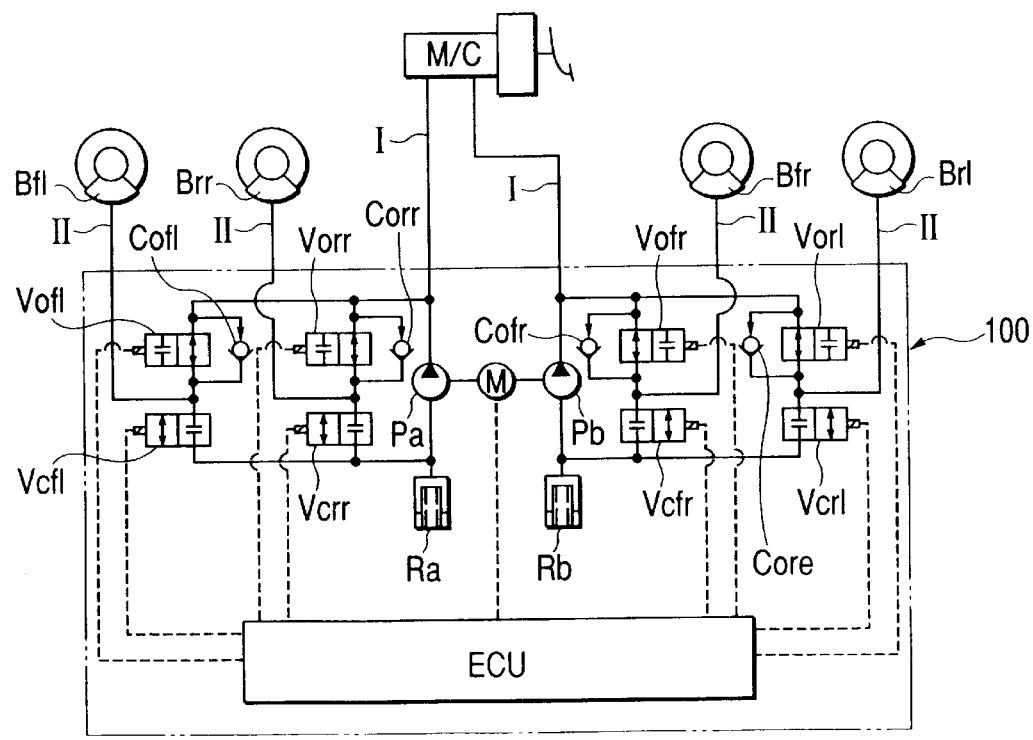
FIG. 9 is an explanatory view showing the operation of a braking system using an electromagnetically driving part.

FIG. 8 shows in magnification the configuration of the portion where a fixed core 15 and a guide cylinder 17 are engaged with each other in a fourth embodiment of an electromagnetically driving part according to the present invention. In FIG. 8, the inner circumferential diameter of the guide cylinder 17 is made even up to the front end thereof, and a diameter-reduced portion 15c is provided in the outer circumferential surface of the fixed core 15 so that an air gap 16b is provided between the front end of the guide cylinder 17 and the outer circumferential surface of the fixed core 15. Since the fixed core 15 is provided with the diameter-reduced portion 15c from a portion slightly retreating from the front end portion of the fixed core 15, the front end of the guide cylinder 17 becomes a free end in the state where the guide cylinder 17 is pressed-fitted. Welding is performed within a region where the air gap 16a is formed between the guide cylinder 17 and the fixed core 15.

In the embodiments shown in FIGS. 6, 7 and 8, in addition to the operation and effect similar to those in the above-mentioned embodiments, the following effect can be obtained by welding a front end portion (a portion C in the drawings) of the guide cylinder 17 which will be a free end. That is, as described above, when the guide cylinder 17 is welded with the fixed core 15 by laser welding or the like, the guide cylinder 17 shrinks slightly after the welding. Therefore, the position where the guide cylinder 17 is pressed in is determined in consideration of the quantity of this shrinkage when the guide cylinder 17 is press-fitted onto the fixed core 15. If the front end of the guide cylinder 17 becomes free as in this embodiment, the shrinkage of the guide cylinder 17 caused by welding can be absorbed in the front end of the guide cylinder 17. Even if the position where the guide cylinder 17 is press-fitted is set in consideration of the quantity of the shrinkage of the guide cylinder 17, an error increases if the quantity of the shrinkage increases. It is therefore difficult to determine the position properly. In such a case, the method of this embodiment in which the quantity of variation of the guide cylinder 17 caused by its shrinkage can be restrained, is effective.

Although description was made about the configuration of the electromagnetically driving part in which the guide cylinder 17 was engaged with the fixed core by laser welding in the embodiments of the present invention, the method for forming the electromagnetically driving part by use of the above-mentioned welding method is not limited to a laser welding method but is applicable to various welding methods. Also in the case of laser welding, there is available a desirable laser device such as a YAG laser, a carbon dioxide gas laser, or the like. In addition, although a normally open electromagnetic valve was described in the above embodiments, the present invention is not limited to these embodiments, but is applicable likewise to other electromagnetically driving parts such as a normally closed electromagnetic valve, an electromagnetic pump, an electromagnetic switch, and so on.

According to an electromagnetically driving part according to the present invention, as described above, welding is performed on a portion where an air gap is formed between the outer circumferential surface of a fixed core and the inner circumferential surface of a guide cylinder, so that the fixed core and the guide cylinder is engaged with each other.

Accordingly, welding can be attained so that a welded portion does not swell from the external surface of the guide cylinder. Thus, the clearance can be reduced between the guide cylinder and an electromagnetic coil, so that the magnetic efficiency can be improved. In addition, sputtering is prevented so that welding can be performed with high reliability. In addition, there is a conspicuous effect that the length of the fixed core is reduced so that the electromagnetically driving part can be miniaturized.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An electromagnetically driving part for use in opening/closing a valve or the like, comprising:

a fixed core;

a movable core movable relative to said fixed core;

a guide cylinder slidably receiving said movable core and fixed to said fixed core therein, said guide cylinder being coupled with said fixed core by welding in a state that said guide cylinder is press-fitted onto said fixed core;

wherein an air gap is formed between an outer circumferential surface of said fixed core and an inner circumferential surface of said guide cylinder, and said fixed core and said guide cylinder are welded with each other in a portion where said air gap is formed.

2. The electromagnetically driving part according to claim 1, wherein said fixed core has a press-in end portion mated with said guide cylinder when said fixed core and said guide cylinder are coupled, to thereby form said air gap between the outer circumferential surface of said press-in end portion of said fixed core and the inner circumferential surface of said guide cylinder.

3. The electromagnetically driving part according to claim 2, wherein said guide cylinder has an pressed-in tip end portion mated with said fixed core when said fixed core and said guide cylinder are coupled, to thereby form said air gap between the inner circumferential surface of said pressed-in tip end portion of said guide cylinder and the outer circumferential surface of said press-in end portion of said fixed core.

4. The electromagnetically driving part according to claim 3, wherein said fixed core and said guide cylinder are coupled by laser welding.

5. The electromagnetically driving part according to claim 3, wherein said gap is formed in a cylindrical shape.

6. The electromagnetically driving part according to claim 3, wherein said press-in end portion of said fixed core is formed by reducing in diameter the remaining portion of said fixed core.

7. The electromagnetically driving part according to claim 3, wherein said pressed-in tip end portion of said guide cylinder is formed by increasing in diameter the remaining portion of said guide cylinder.

8. The electromagnetically driving part according to claim 2, wherein said fixed core and said guide cylinder are coupled by laser welding.

9. The electromagnetically driving part according to claim 2, wherein said gap is formed in a cylindrical shape.

10. The electromagnetically driving part according to claim 2, wherein said press-in end portion of said fixed core is formed by reducing in diameter the remaining portion of said fixed core.

11. The electromagnetically driving part according to claim 1, wherein said guide cylinder has an pressed-in tip end portion mated with said fixed core when said fixed core and said guide cylinder are coupled, to thereby form said air gap between the inner circumferential surface of said pressed-in tip end portion of said guide cylinder and the outer circumferential surface of said fixed core.

12. The electromagnetically driving part according to claim 11, wherein said fixed core and said guide cylinder are coupled by laser welding.

13. The electromagnetically driving part according to claim 11, wherein said gap is formed in a cylindrical shape.

14. The electromagnetically driving part according to claim 11, wherein said pressed-in tip end portion of said guide cylinder is formed by increasing in diameter the remaining portion of said guide cylinder.

15. The electromagnetically driving part according to claim 1, wherein said fixed core and said guide cylinder are coupled by laser welding.

16. The electromagnetically driving part according to claim 1, wherein said gap is formed in a cylindrical shape.

* * * * *

UNITED STATES PATENT AND TRADEMARK OFFICE
CERTIFICATE OF CORRECTION

PATENT NO. : 6,561,597 B1
DATED : May 13, 2003
INVENTOR(S) : Kazuhiro Ota

It is certified that error appears in the above-identified patent and that said Letters Patent is hereby corrected as shown below:

Title page,
Item [30], Foreign Application Priority Data, change "12-086819" to -- 2000-086819 --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,561,597 B1
DATED          : May 13, 2003
INVENTOR(S)    : Kazuhiro Ota It is certified that error appears in the above-identified patent and that said Letters Patent is hereby corrected as shown below:

<u>Title page,</u>
Insert Item -- [75] Assignee: Nissin Kogyo Co., Ltd., Nagano-ken, Japan --.

Signed and Sealed this

Eighteenth Day of May, 2004

JON W. DUDAS
*Acting Director of the United States Patent and Trademark Office*